United States Patent [19]
Olsen et al.

[11] 3,725,567
[45] Apr. 3, 1973

[54] GAS-PRESSURE-INSULATED HIGH-VOLTAGE LINE

[75] Inventors: Willi Olsen; Klaus Schlosser, both of Berlin, Germany

[73] Assignee: Siemens Aktiengesellschaft

[22] Filed: Sept. 14, 1971

[21] Appl. No.: 180,307

[30] Foreign Application Priority Data

Sept. 30, 1970 Germany............P 20 48 989.8

[52] U.S. Cl...............174/16 B, 174/28, 174/99 B, 174/115

[51] Int. Cl................................H01b 9/06

[58] Field of Search.........174/10, 15 C, 16 B, 28, 29, 174/68 B, 99 B, 71 B, 72 B, 115

[56] References Cited

UNITED STATES PATENTS 3,610,947   10/1971   Stephanides.....................174/28
3,361,870   1/1968    Whitehead.......................174/27 X
3,585,270   6/1971    Trump...........................174/28 X
3,564,108   2/1971    Schmitz.........................174/28 X
2,191,071   2/1940    Duttera..........................174/28
2,313,972   3/1943    Rugg et al......................174/99 B X

FOREIGN PATENTS OR APPLICATIONS 681,584   9/1939   Germany.............................174/28

Primary Examiner—Bernard A. Gilheany
Assistant Examiner—A. T. Grimley
Attorney—Carlton Hill et al.

[57] ABSTRACT

A fluid-tight, corrosion-resistant high-voltage line comprises a cylindrical metal casing having a corrosion-resistant coating on its inner surface and a plurality of conductor-supporting frame members having roller bearing contact with the inner surface of the casing whereby the frame members and the conductor they support can be moved along the inner casing wall.

9 Claims, 3 Drawing Figures

PATENTED APR 3 1973  3,725,567
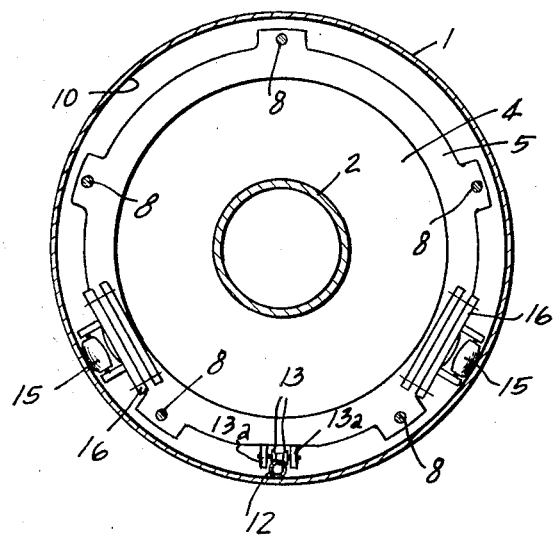
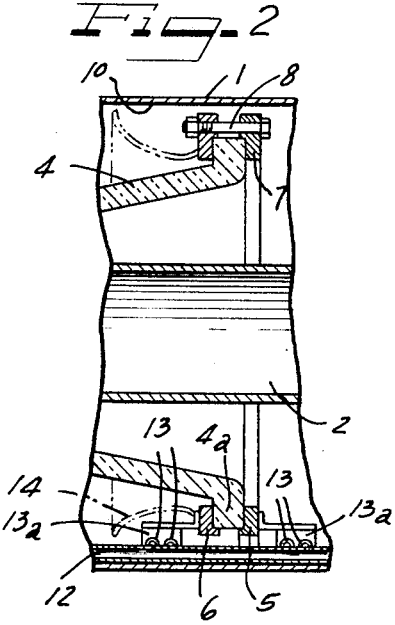
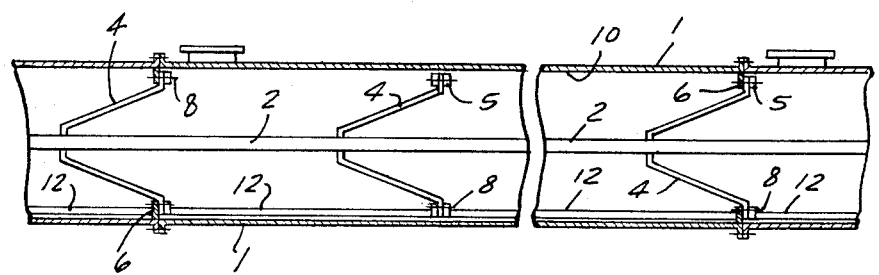
INVENTORS
WILLI OLSEN
KLAUS SCHLOSSER
BY _____ ATTORNEYS

3,725,567

GAS-PRESSURE-INSULATED HIGH-VOLTAGE LINE

BACKGROUND OF THE INVENTION

FIELD OF THE INVENTION

A fluid-tight, corrosion-resistant high-voltage line is formed from a cylindrical metal casing having a corrosion-resistant coating on its inner surface and a conductor is coaxially supported within the casing by a plurality of frame members which ride on rollers within the casing so that the conductor and frame members can be moved along the inner casing wall after the casing is in place.

INTRODUCTION

High-voltage conductors are preferably carried in gas-tight, grounded metal casings which are filled with compressed gas. Such lines are insensitive to climatic variations and have been designed with the electrical conductors carried coaxially within the metal casing by disk-shaped insulators. See for instance "IEE Transactions on Power Apparatus and Systems," January, 1970, pages 17–23.

It has also been observed that such high-voltage transmission lines can be rendered virtually maintenance-free for periods of one year or more by providing the inner wall of a pressurized, gas-filled, cylindrical metal casing with an anti-corrosive, moisture-resistant, protective coating. The corrosion-resistant coating referred to is not the thin variety such as may be produced by submergence but is one of a plastic base having a thickness of one-half millimeter or more. Such a coating can be applied on the outer surface of the casing, too, and, in any event, may be valuable as a dielectric in addition to serving to seal off porosities in the metal parts and insuring gas-tight sealing of the parts.

In one embodiment of the present invention, means are provided to support the main conductor concentrically within the cylindrical casing by frame support members which have rolling engagement with the casing wall so that the conductor and the interconnected frame support members can be moved within the casing without damage to the protective plastic coating adhering to the inner surface of the casing wall.

The ground conductor is disposed within the coated casing wall in spaced relation from the high-voltage conductor and need be connected to the casing wall itself at only a few widely spaced points so that interruption of the corrosion resistant coating is minimized to the greatest extent reasonably possible. Internal corrosion is thus minimized and maintenance work is substantially reduced. Even in those instances where, for example, it may be deemed necessary to connect the ground conductor to the metal casing at every second insulator, the corrosion-resistant coating of the metal casing need be interrupted only half as much as with the hitherto common types of high-voltage lines wherein there is a direct attachment (and thus grounding) of each individual insulator to the metal casing itself.

The ground conductor referred to herein may be formed of inherently stiff wire stock positioned within the casing in juxtaposition to the inner anti-corrosion-coated wall in order to serve as a guide rail to facilitate insertion and removal of the high-voltage conductor in the manner hereafter explained. The high-voltage conductor is carried concentrically of the casing by a plurality of insulators which, in turn, are adapted to move along the inner casing wall. By providing the insulators with rollers adapted to engage and roll along the ground conductor, the high-voltage conductor as well as the insulators will be at least partially supported and guided within the casing by the ground conductor. The ground conductor thus accommodates at least a portion of the weight of the high-voltage conductor and its associated insulators thereby relieving the corrosion-resistant coating. The rollers may be adapted to run in a groove of the ground conductor rail or may include roller faces which engage the ground from two sides.

In the latter case, the ground conductors may simply comprise a small-diameter, stiff tube (as illustrated) which will advantageously be disposed at the lowest point of the casing in closely spaced relation to the coated inner surface of the casing so as to simply support the weight of the high-voltage conductor without any complex attachment being required.

In another embodiment of the invention the ground conductor forms a part of the high-voltage conductor-supporting framework and is inserted into the casing, along with the high-voltage conductor and its insulators as a whole. In this instance, the insulator framework may be provided with large-surface plastic rollers which can carry the necessary weight and run on the corrosion-resistant coating without damage to it. Once the framework is inserted, the ground conductor may be screwed together with a mounting bracket formed integrally, as by welding, with the casing at the ends of the casing sections in order to produce a highly conductive connection to the casing.

Other objects, features and advantages of the present invention will appear from time to time with reference to the accompanying drawings, wherein:

FIG. 1 is a vertical sectional view through the casing showing a portion of one of the frame members in partial side elevation;

FIG. 2 is a vertical sectional view taken through the casing of FIG. 1 and at right angle to the view of FIG. 1; and FIG. 3 is a diagrammatic view showing the disposition of the high-voltage conductor within the casing and the means of connection between the high-voltage conductor and the several frame members.

With reference now to the drawings, the metal casing 1 comprises a steel tube of cylindrical configuration having an aluminum high-voltage conductor 2 of tubular form supported coaxially within the casing 1 by a plurality of conically shaped supporting insulators 4. In the manner well understood by those skilled in this art, the diameter of the high voltage conductor 2 bears a relation to the diameter of the casing 1 of about 1:2.7.

The cone-shaped insulators 4 are arranged within the casing 1 with their axes also coaxial with the casing 1, and each of them has an outturned edge 4a which is supported by a metal frame 5. A plurality of screws 8 interconnect the frame members 5 with associated frame elements 6 and serve to sandwich the outturned edges 4a of the cone-shaped insulators 4 between them. The screw means 8 are distributed about the circumference of the outturned edges 4a at equal intervals.

The casing 1 has its inner surface coated with a corrosion-resistant material such as one of epoxy resin which is applied over the inner circumference of the casing in a thickness of about 1 millimeter, a ground conductor 12 of small diameter cylindrical configuration which has some inherent stiffness to it extends in the longitudinal direction of the casing 1 along the inner wall thereof in juxtaposition to the inner surface of the corrosion-resistant coating on the casing wall. The ground conductor 12 in the illustrated embodiment of the invention comprises a tube having a diameter about 1/25 that of the outer diameter of the casing 1 and is connected with that casing at only a few very widely spaced locations such, for instance, as at all flange connections for the casing itself. As a consequence, at only these widely distributed points is the protective corrosion-resistant coating interrupted.

The metal frame members 5 and their associated frame elements 6 are guided on the ground conductor 12 by a plurality of pairs of rollers 13 which, in turn, are carried on roller brackets 13a connected to the frame members and their associated frame elements 5 and 6. Sheet metal members 14 may overlie the roller pairs so as to electrostatically shield them from the conductor 2. The roller pairs 13 are formed of metal themselves and have a metal-to-metal connection with the brackets 13a and the frame members and associated elements 5 and 6 and serve a double purpose. On the one hand, they provide a good conductive path between the metal frame 5, the associated frame elements 6, and the ground conductor 12 and, on the other hand, they provide a roller-bearing guide for the insulators 4 within the casing 1, so that the insulators 4 may be inserted into the casing 1 and moved relatively therealong without damage to the corrosion-resistant protective coating lining the inner circumference of the casing 1.

The high-voltage conductor 2 may thus be inserted into the casing after the tubular casing elements have been laid out. The insulators 4 then roll on the ground conductor 12 and this conductor in turn has the effect of providing a ground rail. For accommodating the weight of the conductor 2 and the associated insulators 4, large-surface insulated rollers 15 (plastic rollers, for instance) can be attached to the frame members 5 with a simple and preferably adjustable mounting 16. The mounting 16 is illustrated diagrammatically in FIG. 1 and may simply provide a threaded connection between the rollers and the frame members themselves so that the rollers may be moved radially of the casing.

As a consequence of this design, the high-voltage conductor 2 may be formed in very long pieces and then subsequently guided into the casing after the casing is laid out and assembled. The conductor 2 thus need have only a very few coupling points over a very long distance, and the reduction in coupling points will thereby decrease the transit resistance normally occasioned by a multiplicity of conductor connection points. The casing 1 also needs only a few connection points since the casing elements can be made of quite long lengths. The increased length of casing elements permitted by this invention obviously reduces the large number of casing seal points which, in cooperation with the provision of a corrosion-resistant coating on the inner surface of the casing wall provides greater operational safety and freedom from maintenance.

In the embodiment of the invention illustrated in FIG. 3, the ground conductor 12 and the insulators 4 form a supporting framework together which carries the high-voltage conductor 2, and the entire framework including the ground conductor is adapted to be inserted into the casing 1 as a whole when the high-voltage conductor is to be placed within the casing. In such an arrangement the entire supporting framework including the ground conductor, and the insulators 4 as well as the supported conductor 2 is inserted into the casing and rolls along the inner coated wall of the casing 1 with the help of large-surface plastic rollers such as those illustrated at 15 in FIG. 1. In this arrangement the ground conductor 12 in its operational position is screwed together with the mounting plate when the framework is inserted and the mounting plate is welded to the casing 1 and serves as a stop at which the insulators, which are positioned at the ends of the casing section, are fixed in gas-tight relationship.

The foregoing illustrated and described embodiments of our invention have been made for illustrative purposes only and various modifications in our invention may, of course, be made without departing from the spirit and scope of the novel concepts thereof.

We claim as our invention:

1. In a gas-pressure insulated high-voltage line including a hollow metal casing, a high voltage conductor extending longitudinally of the casing, and a plurality of insulators supporting said high-voltage conductor in spaced relation from the wall surface of said casing, the improvement which comprises:

a corrosion-resistant coating lining the inner wall surface of the casing, a conductive metal frame member connected to each of said insulators, a ground conductor extending longitudinally of the casing means electrically interconnecting said frame members and said ground conductor, wherein each said frame member and said ground conductor are contained within said corrosion-resistant coating.

2. A gas pressure insulated high voltage line constructed in accordance with claim 1 wherein said casing is cylindrical in configuration and wherein said high voltage conductor extends coaxially of said casing, and wherein said ground conductor extends longitudinally along and in juxtaposition to the coated inner wall surface of said casing.

3. A gass pressure insulated high voltage line constructed in accordance with claim 2 wherein said ground conductor is formed of form-stiff material to form a rail and wherein the means interconnecting said frame members with said ground conductor permit relative movement between said frame members and said ground conductor while maintaining constant electrical interconnection therebetween.

4. A gas pressure insulated high voltage line constructed in accordance with claim 2 wherein said frame members are provided with roller means which ride on and roll along said ground conductor and wherein said frame members and said roller means and said ground conductor all have electrical interconnection with one another.

5. A gas pressure insulated high voltage line constructed in accordance with claim 4 wherein said ground conductor is formed of form-stiff material to form a rail and wherein the said ground conductor is arranged at the lowest point of the casing cross section to bear the weight of the high voltage conductor and its associated insulators.

6. A gas pressure insulated high voltage line constructed in accordance with claim 1 wherein said ground conductor and said frame members and said insulators are connected together with one another to form a supporting framework for said high voltage conductor and can be moved unitarily within said casing.

7. A gas pressure insulated high voltage line constructed in accordance with claim 1 wherein said ground conductor and said frame members have large-surface-area roller contact with the inner wall surface of said casing whereby said ground conductor and frame members as well as the high voltage conductor and its associated insulators can be moved in roller contact unitarily along the inner wall surface of said casing.

8. A gas pressure insulated high voltage line constructed in accordance with claim 6 wherein said ground conductor is rigidly affixed to a mounting plate having electrical interconnection with said casing.

9. A gas pressure insulated high voltage line constructed in accordance with claim 8 wherein said ground conductor and said frame members and said insulators comprise a supporting framework for said high voltage line and said supporting framework has large-surface-area rollers extending therefrom and engaging the inner coated wall surface of said casing whereby said supporting framework can be moved along said inner casing wall prior to effecting rigid interconnection between said ground conductor and said casing.

* * * * *